United States Patent [19]

Federspiel

[11] 4,372,545
[45] Feb. 8, 1983

[54] SHOCK ABSORBER FOR A VEHICLE WITH A FLEXIBLE SUSPENSION

[75] Inventor: Jean M. Federspiel, Paris, France

[73] Assignee: Commissariat a l'Energie Atomique, Paris, France

[21] Appl. No.: 292,519

[22] Filed: Aug. 13, 1981

Related U.S. Application Data

[63] Continuation of Ser. No. 129,385, which matured from PCT/FR79/00008, Jan. 26, 1979, 102(e) date, Aug. 15, 1979, abandoned.

[30] Foreign Application Priority Data

Jan. 26, 1978 [FR] France .................. 78 02171
Dec. 12, 1978 [FR] France .................. 78 34901

[51] Int. Cl.³ .................. F16F 13/00; F16F 9/19
[52] U.S. Cl. .................. 267/8 R; 137/854;
188/280; 188/282; 188/311; 188/322.19;
244/104 FP; 267/118; 267/127; 280/710
[58] Field of Search .................. 188/280, 311, 322, 282,
188/317, 266, 313, 322.19; 267/8 R, 34, 134,
126, 127, 64.15, 64.16, 118, 150; 244/104 FP,
104 CS; 280/710, 712; 293/134; 137/512, 854

[56] References Cited

U.S. PATENT DOCUMENTS

| | | | |
|---|---|---|---|
| 1,154,962 | 9/1915 | Bayles | 137/517 X |
| 1,780,659 | 11/1930 | Wallace | 267/34 X |
| 2,310,570 | 2/1943 | Briggs | 188/280 X |
| 2,333,096 | 11/1943 | Dowfy | 188/317 X |
| 2,628,044 | 2/1953 | Johnson | 267/127 X |
| 2,917,303 | 12/1959 | Vierling | 267/8 R |
| 3,984,889 | 10/1976 | Blomgren | 188/280 |

FOREIGN PATENT DOCUMENTS

| | | | |
|---|---|---|---|
| 665817 | 10/1965 | Belgium . | |
| 659516 | 3/1963 | Canada | 267/8 R |
| 1655428 | 4/1972 | Fed. Rep. of Germany . | |
| 952367 | 5/1949 | France . | |
| 1073827 | 3/1954 | France | 188/317 |
| 1192844 | 4/1959 | France . | |
| 1341236 | 9/1963 | France . | |
| 1410579 | 8/1965 | France . | |
| 1553977 | 12/1968 | France . | |
| 1560547 | 2/1969 | France | 188/317 |
| 2118635 | 7/1972 | France . | |
| 2324948 | 4/1977 | France . | |
| 2340482 | 9/1977 | France . | |
| 13997 | of 1913 | United Kingdom | 188/313 |
| 422686 | 1/1935 | United Kingdom | 267/8 R |
| 899650 | 6/1962 | United Kingdom | 267/8 R |

*Primary Examiner*—George E. A. Halvosa
*Attorney, Agent, or Firm*—Pearne, Gordon, Sessions, McCoy & Granger

[57] ABSTRACT

The invention relates to a shock absorber mounted between a suspended part and an unsuspended part of a vehicle and specifically a telescopic hydraulic shock absorber comprising a damping piston slidingly mounted in a cylinder. A compensation piston cooperates with the cylinder in order to maintain the damping piston and the cylinder in a given relative position during a variation in the load or centering of the vehicle. The compensation piston has at least one passage controlled by at least one valve sealing the passage to permit the normal operation of the shock absorber during a rapid deformation of the latter as a result of unevennesses of the road. One or more return springs maintain the damping piston at rest in a middle position relative to the cylinder facing a given zone of the latter.

Application to vehicle shock absorbers.

6 Claims, 10 Drawing Figures

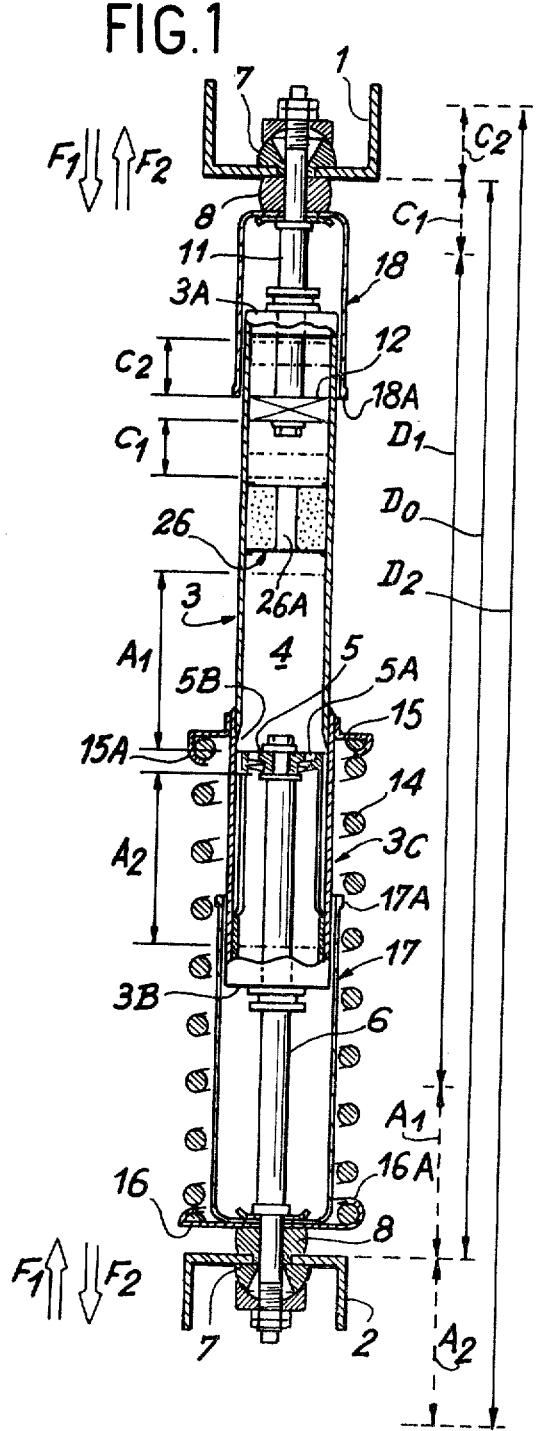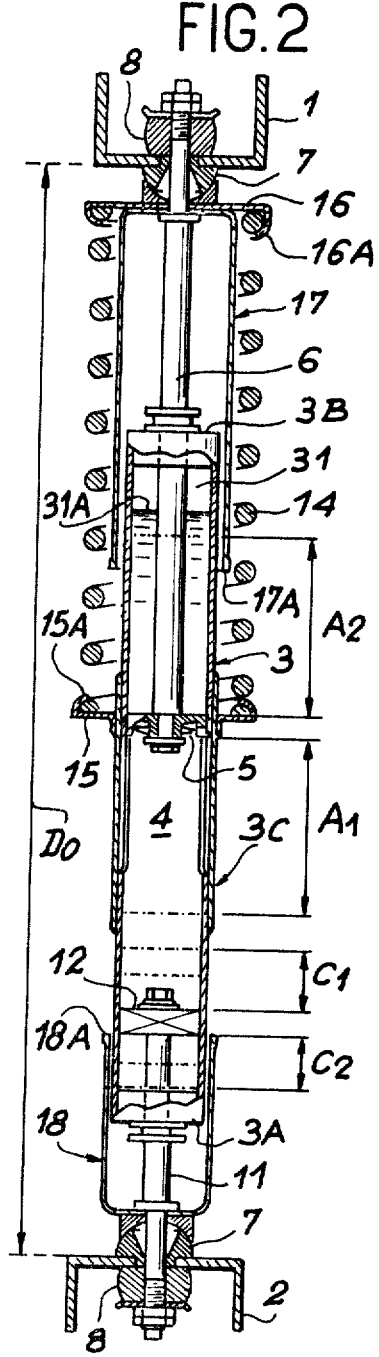

SHOCK ABSORBER FOR A VEHICLE WITH A FLEXIBLE SUSPENSION

This is a continuation of application Ser. No. 129,385, filed Aug. 15, 1979, now abandoned.

BACKGROUND OF THE INVENTION

The present invention relates to a shock absorber for a vehicle with a flexible suspension. The shock absorber has two members which are associated with one another in a deformable manner in the deformation direction of the vehicle suspension. In the operation position, the two members of the shock absorber are respectively fixed to a suspended part and to an unsuspended part of the vehicle.

Numerous shock absorber constructions of the above type are known and in particular telescopic hydraulic shock absorbers which comprise a damping piston slidingly mounted in a cylinder containing a liquid. This cylinder has a first end connected to one of the above-mentioned parts of the vehicle and the damping piston is fixed to a sliding rod traversing the other end of the cylinder and fixed to the other part of the vehicle. In the special case of so-called by-tube shock absorbers, the cylinder is placed within a tubular body with which it communicates.

Most of the known shock absorbers of the type defined hereinbefore give acceptable results under standard conditions of use of the vehicles for which they are provided. However, particularly in the case of vehicles with a high loading capacity and whose suspension is very deformable, the effectiveness of damping or shock absorption is often impaired with known shock absorbers.

Thus, in the case of a load differing from the normal average load, the relative position of the two members of the shock absorber at rest can differ greatly from the position provided by the designer. Thus, the shock absorber functions abnormally and in particular there is a pronounced inadequacy of the use of travel in one operating direction.

The disadvantage of the principle defined hereinbefore linked with the load variations of the vehicle compared with the average load provided is increased if the possible limit values of the total weight of the vehicle in operation have a significant variation. Moreover, for each shock absorber of the vehicle, a local variation in the load supported by the corresponding part of the suspension tends to compromise the efficiency of shock absorption.

Thus, the efficiency of the system of vehicle shock absorbers is dependent on the flexibility of the suspension, which can be greatly deformed in the inoperative position compared with an average position provided by the design for each shock absorber. The above-mentioned deformation of the suspension and of each shock absorber of the vehicle in the inoperative position results both from load variations and variations in the centering of the vehicle.

BRIEF SUMMARY OF THE INVENTION

The object of the invention is to obviate the above disadvantages so as to maintain the full effectiveness of the shock absorbers within a wide deformation range of the vehicle suspension in the inoperative position, whilst retaining the relative position of the two members of each shock absorber in the manner provided by the design, despite load and centering variations on the part of the vehicle.

The invention relates to a shock absorber for a vehicle with flexible suspension, the shock absorber having two members associated with one another in a deformable manner in the deformation direction of the vehicle suspension, the two shock absorber members being provided for connection respectively to a suspended part and an unsuspended part of the vehicle.

According to the invention, the shock absorber comprises compensation means preventing the relative deformation of the two members when the relative displacement speed between said vehicle parts is below a given limiting speed, blocking means neutralising the compensation means when the displacement speed exceeds the limiting speed, return means also being provided to ensure that in the inoperative position the two members of the shock absorber are maintained in a given relative position.

As a result, the relative inoperative position of the two members of the shock absorber is maintained in accordance with the design principle in the case of a slow deformation of the suspension. Thus, for this purpose, the compensation means cooperate with the return means to maintain the two members in the said relative position.

However, as from a chosen limiting value of the relative displacement speed between the suspended and unsuspended parts, the normal operation of the shock absorber is ensured due to blocking means which neutralise the compensation means and oblige the two shock absorber members to act normally relative to one another in order to ensure a desirable shock absorption of the suspended part of the vehicle.

The invention is advantageously applied to a telescopic hydraulic shock absorber, whose members comprise a damping piston slidingly mounted in a cylinder containing a liquid.

In this case, the shock absorber according to the invention is characterised in that the compensation means comprise a compensation piston which cooperates with the cylinder to maintain the damping piston in a given position relative to the latter when the said displacement speed is below the limiting speed, whilst the blocking means comprise at least one passage formed in the compensation piston and controlled by at least one sealing valve which is sensitive to said displacement speed to seal the passage when the latter exceeds the limiting speed.

As will be stated hereinafter, the recommended arrangements permit an effective and economic industrial realisation of a shock absorber according to the invention, particularly in the case of a so-called "sequential" shock absorber in accordance with French Pat. No. 2,079,874 and its Addition No. 2,194,267. For such a sequential shock absorption, it is particularly important to be able to retain in all cases the relative rest position of the two shock absorber members in order to constantly ensure the complete effectiveness of the shock absorber.

Advantageously, the return means are provided to maintain at rest the damping piston in a predetermined position within the cylinder, said means comprising at least one spring interposed between the damping piston and the cylinder.

According to a first embodiment of the invention in which the damping piston is fixed to a sliding rod traversing one end of the cylinder and which can be fixed to one of said parts of the vehicle the compensation piston can be connected to the other part of the vehicle by a sliding rod traversing the other end of the cylinder.

When a shock absorber constructed in accordance with this first embodiment of the invention has at least one spring interposed between the damping piston and the cylinder said spring is preferably a helical spring surrounding the cylinder whereby it has one end bearing on a flange surrounding the cylinder, whilst the other end bears on a cap fixed to the rod of the damping piston and is centered on said rod. The flange surrounding the cylinder and the cap fixed to the damping rod may each have a profiled edge forming a threaded groove to maintain one end of the helical return spring engaged in each of the profiled grooves, permitting the spring to act in tension and in compression between the cap and the flange. Such a shock absorber may also comprise a sleeve for protecting the rod of the damping piston, said sleeve being substantially cylindrical and coaxial to the rod and fixed to the latter within the helical return spring by a closed end of the sleeve applied against the bearing cap of the spring, said protective sleeve having an opening covering the adjacent end of the cylinder and which can slide externally on the latter by following the sliding of the rod of the damping piston.

This method of mounting the return spring of the damping piston permits a robust industrial construction with small overall dimensions. The return spring also cooperates with the normal flexible means of the vehicle suspension.

Preferably, according to this first embodiment of the invention, the compensation piston has two disks of the same diameter perpendicular to the axis of the rod of the compensation piston and each having in the direction of said axis at least one passage radially displaced relative to the rod, the two inner faces facing the disks being substantially parallel and separated by a gap in which is disposed a flexible blank washer centered on the rod of the compensation piston, the blank washer being in the inoperative position substantially parallel to the two facing faces of the disks and having a peripheral edge mounted with a radial clearance relative to the wall of the cylinder surrounding the damping piston.

When the relative displacement speed between the suspended and unsuspended parts of the vehicle is below said limiting speed, the above radial clearance permits the outflow of the liquid by passages formed in the disks. The washer is able to bend when the displacement speed between said parts exceeds the limiting speed. The rim of the washer then tightly bears against one of the inner faces of the disks in such a way as to seal the passages formed in the latter. This prevents the outflow of liquid through the compensation piston and immobilises the latter in the cylinder. The two members of the shock absorber are then obliged to act normally relative to one another to ensure the damping of the vehicle suspension.

Each inner face of the two disks of the compensation piston preferably then have, in axially section, a curved profile which substantially matches the profile of the elastically deformed washer bearing by its edge or rim against the said inner face.

According to a second embodiment of the invention in which the damping piston is fixed to a sliding rod traversing one end of the cylinder and which can be fixed to one of the parts of the vehicle the cylinder is slidingly mounted both around the damping piston and within a jacket fixed to the other part of the vehicle, said cylinder being provided with at least one longitudinal window and having in its part between the damping piston and its end opposite to the rod of the latter at least one passage facing an opening formed in the jacket, the compensation piston having at least one transverse partition integral with the cylinder.

Such a sock absorber is in particular used to equip so-called MacPherson suspensions of the front wheels of certain automobiles. The jacket is fixed to a tubular body, whose lower part is directly connected to the front wheel axle whilst the upper part of this body bears on a helical suspension spring. The longitudinal window formed in the cylinder makes it possible to eliminate the throttling action of the damping piston, at least over part of the piston travel with respect to the cylinder, whilst the passage made in the cylinder and the opening formed in the jacket make it possible to link the inner volume of the cylinder and the annular volume between the jacket and the tubular body of the shock absorber.

In the case of a slow deformation of the suspension, the cylinder slowly slides within the jacket. In the case of a rapid deformation, the above sliding of the cylinder is prevented due to the blocking means provided in the shock absorber and the normal operation of the latter is ensured by the sliding of the damping piston in the cylinder.

According to an advantageous variant of said second embodiment of the invention, in this case the shock absorber has two opposed return springs, one of which is located between one face of the damping piston and one end of the cylinder and the other between the other face of the damping piston and the other end of the cylinder in order to maintain the damping piston at rest and the cylinder is said predetermined position in which the damping piston is disposed in the vicinity of one end of the longitudinal window formed in the cylinder.

According to another preferred variant of this second embodiment of the invention the transverse partition is disposed between the passage formed in the cylinder and the end of the latter opposite to the rod of the damping piston, the passage formed in the compensation piston linking the inner volume of the cylinder in the vicinity of the damping piston and one end of the jacket when the sealing valve is open. Preferably, the transverse partition then has a disk with at least one passage staggered relative to the axis of said disk and two flexible blank washers substantially centered on the axis of the disk, the two washers in the inoperative position being substantially parallel to the disk, a radial clearance being defined between the periphery of the washers and the wall of the jacket to permit the outflow of liquid through the passage formed in the disk when the displacement speed is below the limiting speed, whereby one or other of the washers can bend so as to tightly bear against the corresponding face of the disk in such a way as to seal the passage formed in the latter when the displacement speed exceeds the selected limiting speed. Each opposite face of the disk can then have, in axial section, a curved profile matching the profile of the elastically deformed washer bearing against said face.

These arrangements permit an effective and economic industrial construction of a shock absorber according to the invention.

BRIEF DESCRIPTION OF THE DRAWINGS

The invention is described in greater detail hereinafter relative to non-limitative embodiments and with reference to the attached drawings, wherein show:

FIG. 1 a diagrammatic view in axial section of an embodiment of the invention in the case of a telescopic hydraulic shock absorber.

FIG. 2, analogous to FIG. 1, a variant of the invention for a reverse fitting of the shock absorber.

FIG. 9 a longitudinal half-sectional view of the cylinder and the jacket according to FIG. 5, the piston rod being in the maximum extension position.

FIG. 10 a view identical to FIG. 9, the piston rod being in the maximum compression position.

DETAILED DESCRIPTION OF THE PREFERRED EMBODIMENTS

Figure 3:
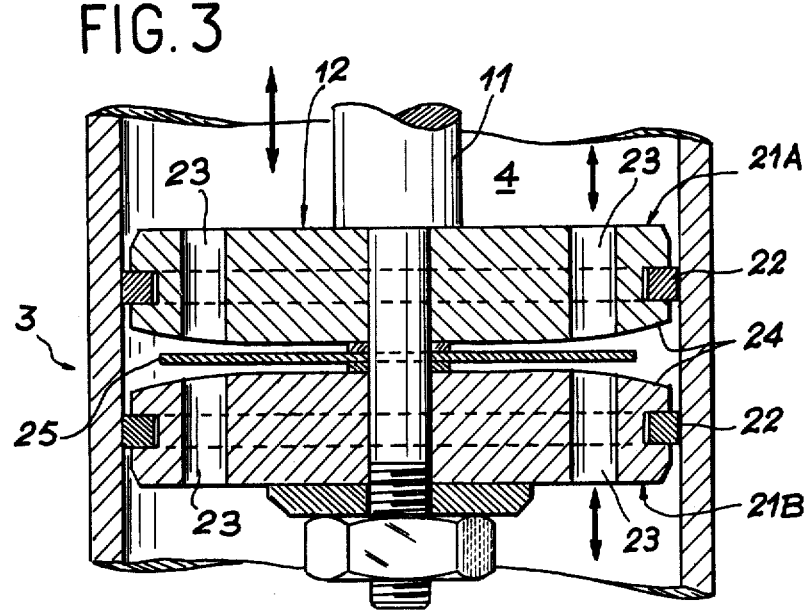
FIGS. 3 and 4 axial sectional views on a larger scale of the compensation piston of the shock absorber of FIG. 1, respectively in the inoperative position and in the sealing position of the flexible washer, corresponding to a rapid elongation of the shock absorber.

As is apparent from FIG. 1, the shock absorber from a not shown vehicle is associated with a not shown flexible suspension system of the vehicle. The shock absorber comprises two members, described hereinafter, associated with one another in a deformable manner in the sense of a deformation of the vehicle suspension, said deformation corresponding either to a moving towards (arrows F1) or a moving away from (arrows F2) a suspended part 1 and an unsuspended part 2 of the vehicle structure. As will be described hereinafter, the two shock absorber members are respectively fixed to the suspended 1 and to the unsuspended part 2 of the vehicle.

In the embodiment of FIG. 1, the shock absorber is, for example, a telescopic hydraulic shock absorber having a cylinder 3 which contains liquid 4, such as a non-freezing and ageing-resistant mineral oil. Cylinder 3 is surrounded over part of its height by a jacket 3C. A first end 3A of cylinder 3 is connected, for example, to the suspended part of the vehicle structure, as will be explained hereinafter.

A damping piston 5, slidingly mounted in cylinder 3 is integral with a sliding damping rod 6 traversing the other end 3B of cylinder 4. Cylinder 3 and damping rod 6 constitute the two main members of the shock absorber.

For example, damping piston 5 (FIG. 1) has a variable throttling valve 5A in accordance with French Pat. No. 7,530,944.

Valve 5A makes it possible to obtain a good damping efficiency in the case of a sequential shock absorber.

The completely effective functioning of the said sequential shock absorber assumes that the damping piston 5, when at rest, is in a predetermined position facing a transition zone 5B of the inner wall of cylinder 3. Transition zone 5B separates two regions of the inner wall of cylinder 3, which may or may not correspond to a tight sliding of the damping piston 5. Thus, different effects occur, depending on whether the piston slides in the contraction or extension directions of the shock absorbers (arrows F1 and F2).

Thus, as shown in exemplified manner in FIG. 1, the damping piston 5 is located in its rest position facing transition zone 5B of the inner wall of cylinder 3 for a value "D0" of the assembly length of the shock absorber between parts 1 and 2 of the vehicle structure in the case of an average deformation of the not shown flexible suspension corresponding to average load and position values of the vehicle, which is at rest.

The damping rod 6 (FIG. 1) secured for example to the unsuspended part 2 of the vehicle is fixed thereto preferably by means of an orientatable fastening comprising a ball joint 7 and an annular elastic block 8, for example of rubber, working in compression to facilitate angular displacements of damping rod 6.

According to the invention, one of the shock absorber members has compensation means permitting a slow deformation of said member, in order to compensate a slow deformation of the vehicle suspension, corresponding for example to the two parts 1, 2 moving towards one another (arrows F1). Blocking means are provided to prevent the deformation of the said member of the shock absorber when the deformation speed tends to exceed a limiting value selected by the designer. Moreover, return means are provided to ensure that in the rest position the two shock absorber members are maintained in the above-mentioned predetermined relative position, such as is shown for example in FIG. 1.

Reference will be made hereinafter to an embodiment of the above-mentioned return means and blocking means, as well as to a method for determining and regulating the limiting deformation speed of the said member of the shock absorber.

Figure 4:
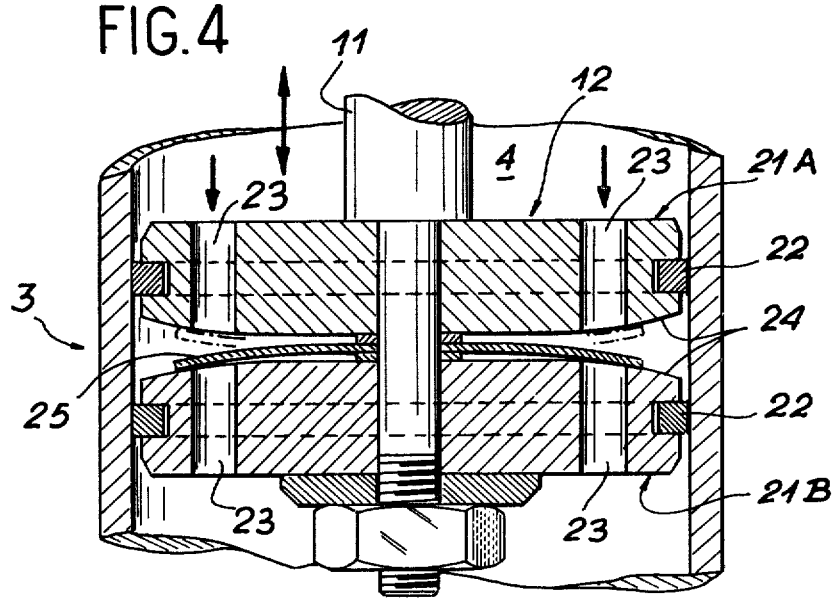

In the embodiment shown in exemplified manner in FIGS. 1, 3 and 4, the first end 3A of cylinder 3 of the telescopic hydraulic shock absorber, described hereinbefore, is connected to the corresponding part of the vehicle, such as the suspended part 1, by another sliding rod 11 of the compensation piston 12 slidingly mounted in cylinder 3.

The assembly of the compensation rod 11 on the suspended part 1 is identical to that of the damping rod 6 on the unsuspended part 2 (FIG. 1).

Compensation piston 12 has at least one passage described hereinafter for the outflow of liquid 4 through the piston. A sealing valve, also described hereinafter, is associated with the above passage of the compensation piston 12 and is controlled by means for detecting the outflow speed of the liquid in the passage in order to seal the latter when the liquid outflow speed tends to exceed a value corresponding to the limiting deformation speed selected for the shock absorber.

In the embodiment of FIG. 1, the return means are provided to maintain at rest the damping piston 5 in its given position facing transition zone 5B in cylinder 3 of the telescopic shock absorber.

The rest position of piston 5, corresponds to the assembly length "D0" of the shock absorber, between the two parts 1, 2 of the vehicle for a normal loading of the latter.

Advantageously, the return means of the damping piston 5 comprises a spring 14, separate from the not shown suspension spring, having one end fixed to the rod 6 of the damping piston. Rod 6 is fixed in the operating position to one of the parts of the vehicle, such as the unsuspended part 2.

Preferably, the return spring 14 is a helical spring surrounding cylinder 3. One end of spring 14 bears on a flange 15 which passes round cylinder 3 and the other end of spring 14 bears on a cap 16 integral with the damping rod 6 and centered on said rod.

Advantageously, the flange 15 which passes round cylinder 3 and cap 16 integral with damping rod 6 each have a profiled edge 15A, 16A.

Each of the profiled edges 15A, 16A forms a threaded groove for retaining one end of the helical return spring 14. This makes it possible for spring 14 to act either in compression or in tension between cap 16 and flange 15, as will be described hereinafter.

The telescopic shock absorber shown in FIG. 1 advantageously has a sliding sleeve 17 for protecting the damping rod 6 and another sliding sleeve 18 for protecting the compensation rod 11. The two sleeves 17, 18 each has an opening 17A and 18A, which covers the adjacent end 3B, 3A of cylinder 3 and can slide on cylinder 3, whilst following the sliding of rod 6, 11 to which the sleeve is fixed.

Sleeve 17 protecting the damping rod 6 is mounted within the helical return spring 14, whose guidance relative to cylinder 3 it facilitates. Compensation piston 12, shown in FIG. 1 and shown in greater detail in FIGS. 3 and 4, has two disks 21A, 21B of the same diameter and perpendicular to the axis of rod 11. Each disk 21A, 21B, mounted so as to slide tightly within cylinder 3, to this end carries an annular lining 22. Each disk has in the direction of the axis of rod 11 a certain number of passages 23, which are radially staggered in substantially symmetrical manner relative to rod 11.

The two inner faces 24 of disks 21A, 21B are substantially parallel and are separated by a gap where there is a flexible blank washer 25 centered on rod 11. In the rest position (FIG. 3) the blank washer 25 is substantially parallel to the two facing faces 24 of disks 21A, 21B and has a peripheral edge mounted with a radial clearance relative to the wall of cylinder 3 surrounding piston 12.

For a slow displacement of the compensation piston, said radial clearance of flexible washer 25 permits the passage of liquid 4 on either side of said washer (FIG. 3). However, when the outflow speed of liquid 4 through piston 12 tends to exceed a value corresponding to the limiting value chosen for the deformation speed of the shock absorber the flexibility of washer 25 permits a bending of the latter under the action of the liquid outflow. The peripheral edge of washer 25 is then able to bear tightly against one of the inner faces 24 of disks 21A, 21B (FIG. 4), sealing the corresponding passages 23. This prevents the outflow of liquid 4 through compensation piston 12, preventing the sliding of piston 12 in cylinder 3 of the shock absorber.

Preferably, each inner face 24 of disks 21A, 21B of compensation piston 12 has, in axial section, a curved profile which is substantially matched to the profile of the elastically deformed washer bearing by its peripheral edge against the inner face 24 (FIG. 4).

As shown in FIG. 1, cylinder 3 of the telescopic hydraulic shock absorber according to the invention is preferably completely filled with liquid 4 in the operating position. To compensate the volume variations offered to the liquid 4 in cylinder 3 as a result of the sliding of rods 6 and 11, cylinder 3 advantageously contains an elastic element with a variable volume.

For example, the elastic element with a variable volume is constituted by a piece 26 made from expanded synthetic rubber such as neoprene, which is resistant to the corrosive action of liquid 4 contained in cylinder 3. The elastic piece 26 mounted in cylinder 3 between the limiting positions of damping piston 5 and compensation piston 12 advantageously has a honeycombed structure with closed cells in such a way that it is not impregnated by liquid 4. The elastic piece 26 has, for example, an annular shape offering an axial passage 26A in the direction of the axis of cylinder 3 for the outflow of liquid 4 through piece 26, as described hereinafter.

The operation and advantages of the shock absorber according to the invention, as defined relative to FIGS. 1, 3 and 4 will now be described.

It is assumed that the vehicle and the shock absorber are in the rest position with an average loading of the vehicle corresponding to the distance "D0" (FIG. 1) between parts 1 and 2 of the vehicle, to which are fixed the ends of rods 11 and 6 of the shock absorber.

If the load or centering of the vehicle is modified, the not shown elastic suspension deforms, for example in the direction of arrow F1 (shortening of the shock absorber), corresponding to an increase in the local loading undergone by the parts of the suspension associated with the shock absorber. If the local loading decreases due to a lightening or inverse variation in the centering of the vehicle, the suspension is deformed in the direction of arrow F2 (extension of the shock absorber).

If the shock absorber deformation speed is slow, the compensation piston 12 can slide in cylinder 3. Thus (FIG. 3), the flexible washer 25 remains substantially flat and permits the flow of liquid 4 from one side to the other of piston 12 through passages 23 of disks 21A, 21B in one or other direction. Thus, compensation piston 12 (FIG. 1) can slide in cylinder 3 in the direction of arrow F1 by a maximum quantity C1 corresponding to a shortening of the shock absorber. Piston 12 can also slide by a maximum quantity C2 in the other direction (arrow F2) corresponding to a lengthening of the shock absorber.

Return spring 14 with its two ends respectively fixed to the flange 15 of cylinder 3 and cap 16 of damping rod 6 acts in one or other direction (arrows F1, F2) to ensure the maintaining of damping piston 5 in cylinder 3 in its predetermined rest position facing the transition zone 5B of the inner wall of cylinder 3. The above-mentioned rest position of damping piston 5 permits the latter to effect a useful damping travel A1, or A2, reserving the complete effectiveness of the shock absorber in each direction.

In any random position of the compensation piston 12, the vehicle suspension can be subject to a stronger action causing a deformation of the shock absorber at a speed in excess of the selected limiting speed. In this case, the elastic washer 25 is subject to a sagging action (FIG. 4) under the effect of the passage of liquid 4 through compensation piston 12. The latter is thus locked in cylinder 3 obliging the damping piston 5 to slide in cylinder 3 to ensure the desired damping action of the vehicle.

In the sense of a contraction of the shock absorber (arrow F1) the damping piston 5 can also slide in cylinder 3 within the limits of the maximum travel A1 with respect to the rest position thereof shown in FIG. 1. In the other direction (arrow F2) corresponding to an extension of the shock absorber, damping piston 5 may slide in cylinder 3 in accordance with a maximum travel A2.

Compared with the normal assembly length "D0" of the shock absorber in the rest position for an average loading of the vehicle FIG. 1 shows the extreme values D1 and D2 of the shortened or lengthened shock absorber length permitted by the design. In absolute values, these extreme lengths corresponds to the following equations:

$$D1 = D0 - (C1 + A1) \quad (1)$$

$$D2 = D0 + (C2 + A2) \quad (2)$$

In practice, the values C1 and C2 of the limiting travels provided in each direction for compensation piston 12 have been chosen as a function of the flexibility of the vehicle suspension and taking account of possible variations of the loading and centering of the vehicle in the rest position. In general, the same absolute values given to the limiting travel C1 and C2.

In general, the limiting travels A1 and A2 provided for the damping piston 5 also have the same absolute value, significantly higher than that of C1 and C2, to take account of the large dynamic stresses to which the vehicle suspension is subject in operation and of the necessary shock absorption.

Beyond the deformation amplitude of the shock absorber corresponding to the limiting travels C1 and C2 of compensation piston 12 (FIG. 1) the latter is locked in cylinder 3 by end of travel stops (not shown). In the same way for a deformation speed of the shock absorber, tending to exceed the selecting limiting value, compensation piston 12 is locked in cylinder 3 by the effect of hydraulic locking resulting from the complete bending of the sealing washer 25 (FIG. 4). This locking of compensation piston 12 obliges the damping piston 5 to slide when required in cylinder 3.

Return spring 14, fixed by its ends to flange 15 and to cap 16 where it is held by threaded grooves 15A, 16A, can thus usefully cooperate in tension and in compression with the not shown flexible suspension of the vehicle, when the deformation speed of the shock absorber exceeds the selected limiting value. The shock absorber according to the invention has a number of advantages compared with known shock absorbers.

At slow speed, the sliding of compensation piston 12 in accordance with an elongation travel C2 or shortening travel C1, permits a slow deformation of the shock absorber. The return spring 14 thus constantly maintains the damping piston 5 in its rest position provided by the design facing the transition zone 5B of the inner wall of cylinder 3. This ensures a complete effectiveness of the shock absorber in one or other operating direction (arrows F1, F2).

The maintaining of damping piston 5 in its rest position is particularly important in the case of the already mentioned sequential shock absorber. Such a shock absorber is in fact provided to act in an asymmetrical manner from a given rest position of the damping piston 5 and if this is not the case the complete effectiveness and efficiency of the shock absorber are not ensured.

In the embodiment of the compensation piston 12 according to FIGS. 3 and 4 it is easy to experimentally determine the characteristics of flexible washer 25 to accurately ensure the sealing of passages 23 at the moment when the liquid outflow speed tends to exceed the selected limiting value. This corresponds for example to a movement of compensation piston 12 lasting 10 seconds for a travel C1 (FIG. 1). A washer 25 is used which has a certain thickness having a diametrical clearance which is reduced relative to the inner wall of cylinder 3. If the operation of piston 12 reveals an excessive sensitivity of washer 25, the diametrical clearance of the washer is increased to reduce the effect of liquid outflow. It is also possible to increase the thickness of the washer to reduce the flexibility.

The rounded profile of disks 21A, 21B matching that of bending washer 25 (FIG. 4) ensures a precise sealing of passages 23, preventing an undesirable wear of the disks, which are for example made from light metal, due to the rim of the washer made from steel.

The fixing of the two ends of the helical return spring 14 in threaded grooves 15A, 16A of flange 15 of cylinder 3 and cap 16 of damping rod 6 advantageously permits spring 14 to act either in compression or in tension. Spring 14 can thus maintain the rest position of damping piston 5 to compensate a slow deformation of the shock absorber. Spring 14 can also cooperate with the flexible suspension of the vehicle, when the shock absorber deformation speed exceeds the selected limiting value.

NUMERICAL EXAMPLE

An industrial realisation of the invention is in accordance with that described relative to FIGS. 1, 3 and 4 and has been studied for a sequential shock absorber.

The shock absorber comprises a damping piston 5 equipped with a variable throttle valve.

The mean value "D0" of the assembly length of the shock absorber in the rest position (FIG. 1) is 476 mm. The possible travel of damping piston 5 in either direction (A1 or A2) is 75 mm and the travel of compensation piston 12 in either direction (C1 or C2) is 25 mm. Thus, the minimum length D1 of the shock absorber is 375 mm and its maximum D2 length is 575 mm. The two pistons 5, 12 have a diameter of 35 mm corresponding to a medium-sized automobile. The damping rod 6 and compensation rod 11 have a diameter of 12 mm.

The thickness of each disk 21A, 21B of damping piston 12 is approximately 8 mm in its central portion on rod 11 and approximately 6.5 mm in its thinner edge portion, corresponding to the curved profile provided so as to match the profile of bent washer 25 (FIG. 4). The thickness of the high strength steel washer 25 is 0.5 mm, whilst its diameter is approximately 30 mm. Each disk 21A, 21B has 8 cylindrical holes 23 with a diameter of 2.5 mm, regularly distributed around rod 11. For sealing holes 23 (FIG. 4) the deflection of the rim of washer 25 is approximately 0.7 mm in either direction starting from its rest position (FIG. 3).

To regulate the sensitivity of the blank washer 23, its radial clearance can be adjusted relative to the inner wall of cylinder 3, as has been stated hereinbefore, by measuring the travel time of the compensation rod 11 (FIG. 1) relative to a given duration of for example 10 seconds for a course C1. By applying progressively increasing loads to rod 11 it is attempted to bring about the complete bending or sagging of blank washer 25 (FIG. 4) and the locking of compensation piston 12 for a load of rod 11 corresponding to the above-mentioned limiting duration.

In FIG. 2, analogous to FIG. 1, a variant of the shock absorber of FIG. 1 is shown, whose substantially vertical assembly is reversed compared with that described hereinbefore.

The compensation rod 11 is fixed to the unsuspended part 2 of the vehicle structure and the end 3A of the cylinder, associated with the compensation piston 12 is at the bottom of the shock absorber in this assembly mode.

It is thus possible to reserve a gaseous volume 31 in the cylinder 3 of the shock absorber above the upper level 31A of liquid 4 on the side of the upper end 3B of the cylinder. This arrangement makes it possible to eliminate the internal elastic piece 26 of FIG. 1, the gaseous volume 31 ensuring the compensation of the internal volume variations resulting from the sliding of rods 6 and 11.

Moreover, the reverse assembly mode of FIG. 2 makes it possible to dispose the return spring 14 in the upper part of the shock absorber where it is easier to protect it from dirt and against the action of bad weather.

Obviously, the invention is not limited to the embodiment described hereinbefore with reference to FIGS. 1, 3 and 4 or to the variants shown in FIG. 2.

Thus, FIGS. 5 to 10 show a shock absorber for equipping a MacPherson-type suspension incorporating the teaching of the present invention.

Figure 5:
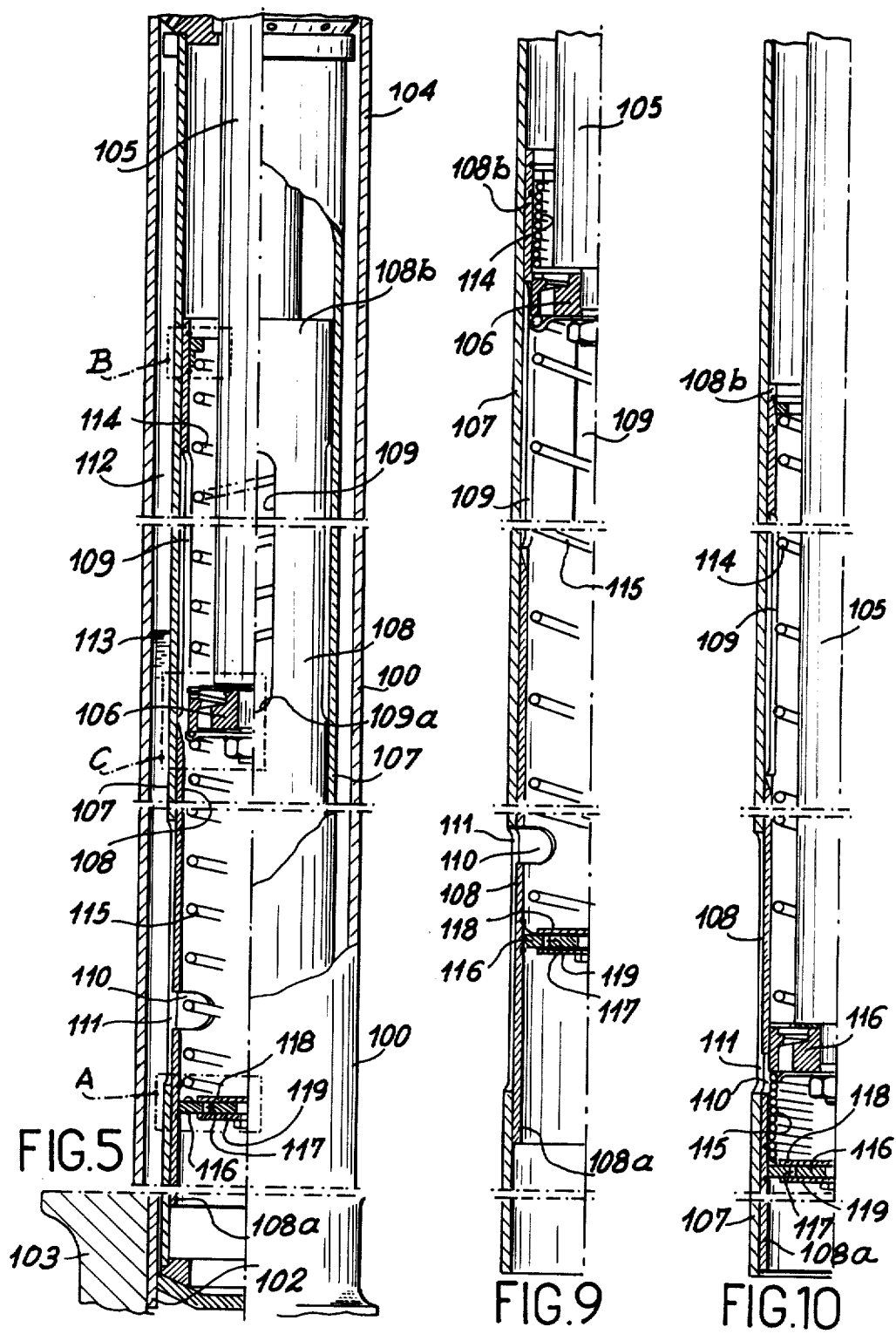
FIG. 5 an elevational view with tearing away and part longitudinal section of a second embodiment of the invention illustrating the application thereof to a shock absorber for equipping a MacPherson-type suspension.

In the embodiment of FIG. 5, the shock absorber comprises a tubular body 100, whose lower part 102 is fixed to a partly shown flange 103 forming part of a not shown wheel axle which is to receive a wheel. The upper part 104 of body 100 has to bear against a helical suspension spring (not shown). This upper part 104 is traversed by a damping rod 105 which is fixed to the suspended part of a vehicle. This rod 105 is fixed to a damping piston 106 slidingly mounted in a cylinder 108, itself slidingly mounted in a jacket 107 coaxial to body 100, but having a smaller diameter than the latter.

The sliding cylinder 108 is provided with longitudinal windows 109 to eliminate the throttling action of damping piston 106 over part of the possible travel of said piston relative to said cylinder 108.

Moreover, the sliding cylinder 108 has in its part between piston 106 and its end 108a opposite to rod 105 a passage 110 facing an opening 111 of jacket 107 in order to connect the internal volume of 108 and the annular volume of 112 between jacket 7 and the inner wall of tubular body 100. For damping liquid 113 this annular volume 112, constitutes an expansion chamber permitting the compensation of the volume of rod 105 during its retraction into body 100.

Moreover, the shock absorber has two opposed return springs 114, 115, one of which 114 is located between piston 106 and the upper end 108b of cylinder 108 and the other 115 located between the damping piston 106 and a compensation piston or bulkhead 116 disposed between the lower wall 108a of cylinder 108 and the passage 110 provided in the latter. As can be gathered from the more detailed description of the operation of this second embodiment, the opposed springs 114, 115 maintain piston 106 in the rest position facing the lower end 109a of windows 109 of cylinder 108.

The bulkhead 116, transversely mounted in cylinder 108 comprises a disk having (of FIG. 6) at least one passage 117 staggered relative to the X—X axis of said disk. Two flexible blank washers 118, 119 are fixed perpendicularly to the axis of disk 116 by means of washers 120 and a screw 121 traversing disk 116. In the rest position, said two washers 118, 119 are substantially parallel to the disk (case of washer 118 in FIG. 6) and a clearance 117a is provided between the periphery of washer 118 and passage 117 to permit the outflow of liquid through said passage during a slow displacement of the liquid.

Figure 6:
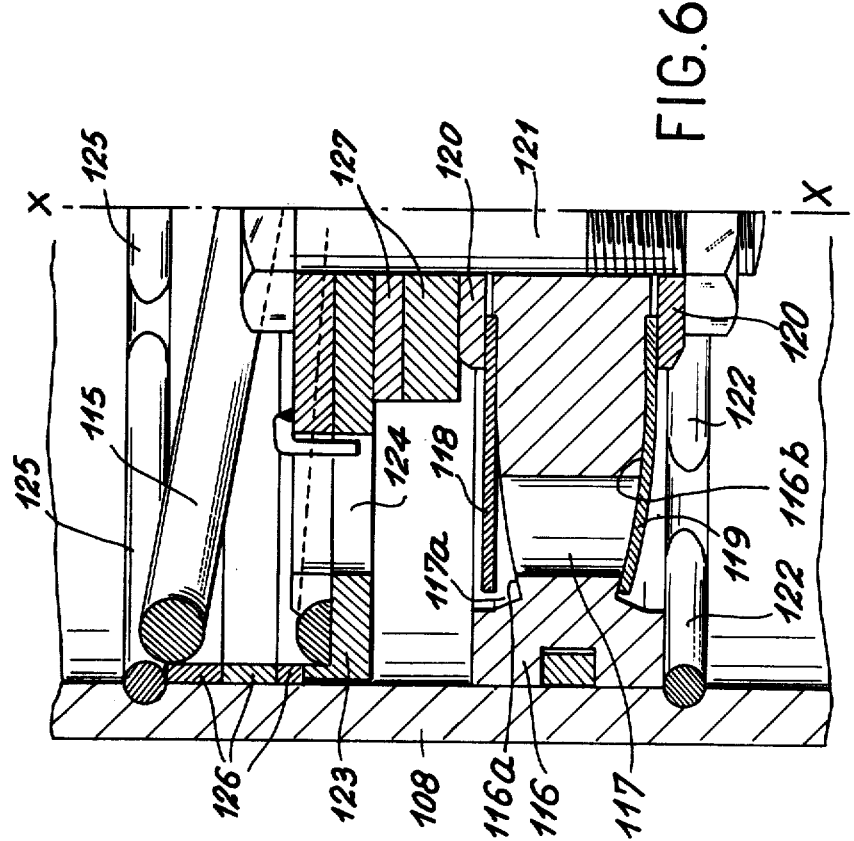
FIG. 6 a larger scale view of detail A of FIG. 5.
Figure 7:
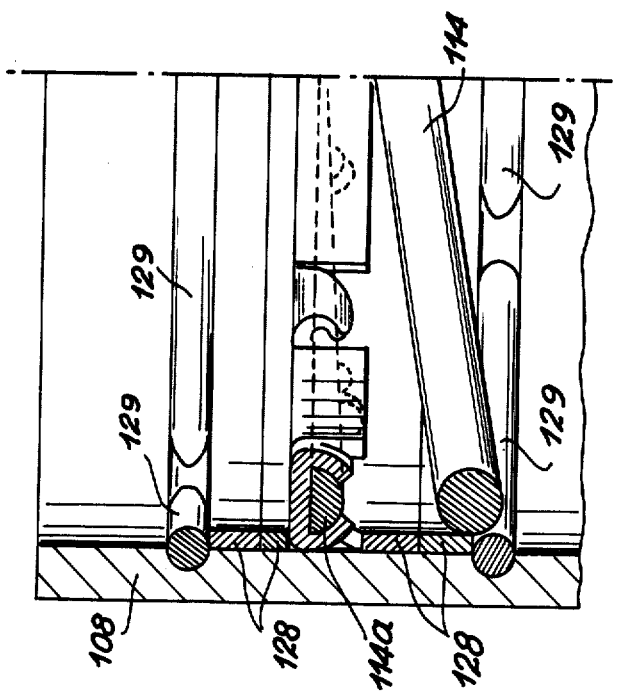
FIG. 7 a larger scale view of detail B of FIG. 5.

Moreover, the flexibility of washers 118, 119 is adequate to permit the bending of the latter under the action of the liquid flow in order to bring one or other of said washers 118,119 into tight engagement with the corresponding face 116a or 116b of disk 116 in order to seal the passage 117 (case of washer 119 on FIG. 6).

FIG. 6 also shows that each opposite face 116a or 116b of disk 116 has in axial section a curved profile matching the profile of the elastically deformed washer (case of washer 119) bearing against the corresponding face 116b.

In the embodiment of FIG. 6, disk 116 is immobilised in its lower part relative to cylinder 108 by means of a circular locking ring 122 anchored in a groove of the wall of cylinder 108. Moreover, spring 115 bears on an end fitting 123 which is fixed to disk 116 by screw 121. This end fitting 123 has a passage 124 for the damping liquid. In addition, said end fitting 123 is upwardly immobilised by a circular locking ring 125, identical to locking ring 122. In addition, the position of end fitting 123 can be regulated by shims 126 and 127.

The upper end 114a of spring 114 (of FIG. 7) is immobilised relative to cylinder 108 by positioning shims 128 located between the two circular locking rings 129 anchored in the wall of cylinder 108.

Figure 8:
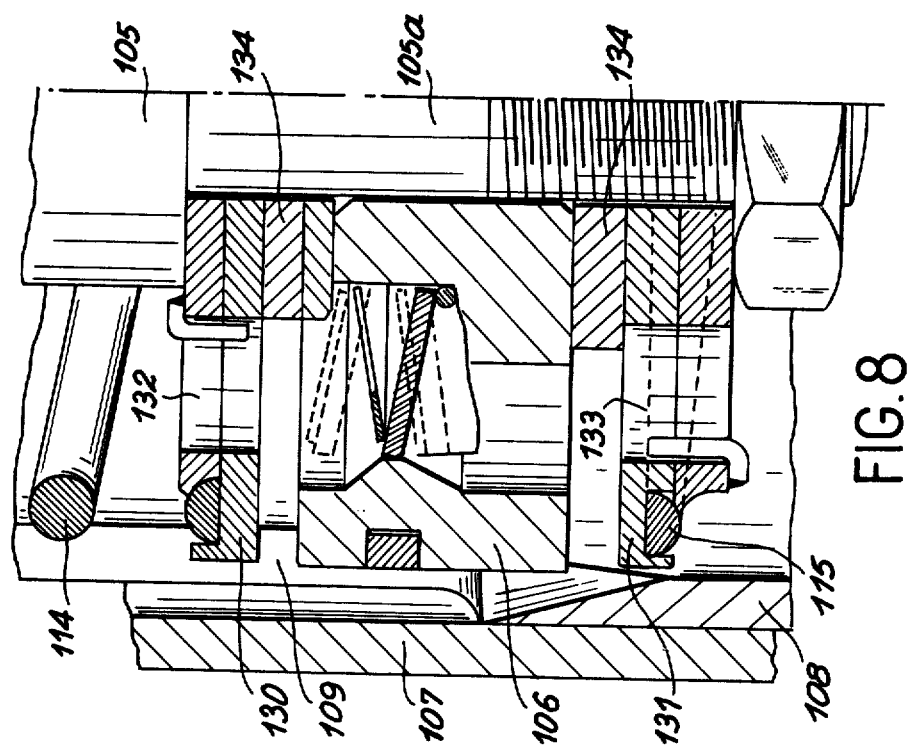
FIG. 8 a larger scale view of detail C of FIG. 5.

FIG. 8 also shows that the springs 114 and 115 are fixed to piston 106 by end fittings 130, 131, which can be dismantled into two coaxial parts, centered on the end 105a of rod 105. End fittings 130, 131 have passages 132, 133 for the damping liquid. Moreover, end fittings 130, 131 are spaced from piston 106 by washers 134.

The operation of the shock absorber described hereinbefore with reference to FIGS. 5 to 10 is as follows:

With a normal loading of the vehicle, piston 106 and cylinder 108 occupy the position shown in FIG. 5. Variations in the vehicle loading lead to variations in the position of the latter which bring about displacements of piston 106 relative to tubular body 100. In the case of a slow displacement speed of piston 106 the antagonising action of springs 114, 115 tends to displace cylinder 108 within jacket 107, in such a way that piston 106 is positioned in the position indicated in FIG. 5 in the vicinity of the lower end of windows 109.

Cylinder 108 is displaced slowly due to the deceleration of the damping liquid through passages 117A of partition 116, flexible washers 118, 119 remaining spaced from passages 117.

When the vehicle is travelling on the road, piston 106 effects rapid movements relative to jacket 107 leading to rapid movements of the damping liquid. These rapid flow speeds of the liquid lead to pressures such that flexible washers 118, 119 are applied, in accordance with the displacement direction of piston 106, to the faces 116a or 116b thus sealing the passage 117 of disk 116. This has the effect of preventing any displacement of cylinder 108 within jacket 107. Thus, piston 106 slides normally in cylinder 108 in such a way that the position of windows 109 relative to jacket 107 is maintained (provided that the vehicle load undergoes no further modification) in the most favourable position relative to piston 106 for the operation of the abovementioned sequential shock absorber.

In FIGS. 9 and 10, piston 106 is shown in two extreme positions of its travel. In FIG. 9, both piston 106 and cylinder 108 are in the maximum upper position. In FIG. 10, piston 106 and cylinder 108 are in the maximum lower position.

Obviously, the invention is not limited to the embodiments described hereinbefore and various modifications can be made thereto without passing beyond the scope of the invention.

Thus, in the second embodiment, the means for locking the sliding of cylinder 108 relative to jacket 107 constituted in this embodiment by flexible washers 118, 119 cooperating with passages 117 of the disk 116 can be replaced by any valve device which is sensitive to the flow speed of the damping liquid. In the same way, the shims 106 of FIG. 6 can be replaced by a plurality of grooves serving to receive the locking ring 125. The shims 128 of FIG. 7 can also be replaced by a certain number of grooves able to receive the locking rings 129.

What is claimed is:

1. A hydraulic shock absorber for a vehicle with a flexible suspension, comprising:
    a damping piston member slidably mounted in a first cylinder member containing a liquid immersing the damping piston member;
    at least one return spring bearing simultaneously on said damping piston member and on said first cylinder member to maintain at rest the damping piston member in a predetermined position relative to the first cylinder member to allow the latter to effect a useful travel inside said first cylinder member in each direction;
    a compensation piston member slidably mounted in a second cylinder member communicating with said first cylinder member and containing said liquid, said compensation piston member being immersed in said liquid, said predetermined position of the damping piston member being independent of the position of the compensation piston member;
    at least one of said piston members being integral with a sliding rod traversing one end of said cylinder member in which said one piston member is slidably mounted;
    means for compensating variations of an internal volume defined in said cylinder member resulting from sliding of said sliding rod into and out of said cylinder member;
    one of said damping piston and first cylinder members being integral with one of said compensation piston member and second cylinder member, whereas, the other of said members are fixed respectively to a suspended part and an unsuspended part of the vehicle;
    at least one passage extending through said compensation piston member, said passage being controlled by at least one sealing valve sensitive to a relative displacement speed between said parts of the vehicle to open said passage when said relative displacement speed is below a given limiting speed, in order to allow a displacement of said compensation piston member inside said second cylinder member when the load of the vehicle varies, and to seal said passage when said relative displacement speed exceeds said given limiting speed, in order to prevent said compensation piston member from moving inside said second cylinder member when the relative displacement between said parts of the vehicle should be damped, the location of said damping piston member relative to said first cylinder member being independent of the load of the vehicle.

2. A hydraulic shock absorber according to claim 1, wherein said first and second cylinder members define coaxial portions of a single cylinder, said damping piston member being integral with a first sliding rod fixed to a first of said parts of the vehicle and said compensation piston member being integral with a second sliding rod fixed to a second of said parts of the vehicle.

3. A hydraulic shock absorber according to claim 2, wherein said return spring is a helical spring surrounding said single cylinder, one end of said spring bearing on a flange surrounding and fixed to the single cylinder and the other end bearing on a cap fixed to said first sliding rod, said flange and said cap each having a profiled edge forming a threaded groove maintaining the corresponding end of said spring, whereby the latter acts in tension and in compression between said cap and said flange.

4. A hydraulic shock absorber according to claim 3, wherein a substantially cylindrical protective sleeve is located within the helical return spring coaxially to the first sliding rod and defines a closed end fixed to the latter and applied against said cap and an opening covering the adjacent end of the single cylinder, said protective sleeve being adapted to slide externally on the latter when said first sliding rod moves relative to said single cylinder.

5. A hydraulic shock absorber according to claim 1, 2, 3, or 4, wherein the compensation piston member comprises two disks through which extend said at least one passage, the latter being radially displaced relative to the second sliding rod, two inner facing faces of said disks being substantially parallel and separated by a gap in which is disposed a flexible blank washer centered on the second sliding rod and having a peripheral edge mounted with a radial clearance relative to said single cylinder, said washer forming said sealing valve sensitive to the relative displacement speed between said parts of the vehicle.

6. A hydraulic shock absorber according to claim 5, wherein each of said inner facing faces has, in section, a curved profile substantially matching the profile of said washer when the latter is elastically deformed and bears against said inner facing face.

* * * * *